W. H. GREELEY.
MANUSCRIPT WRITING PAPER.
APPLICATION FILED FEB. 26, 1915.
1,151,782.
Patented Aug. 31, 1915.
2 SHEETS—SHEET 2.
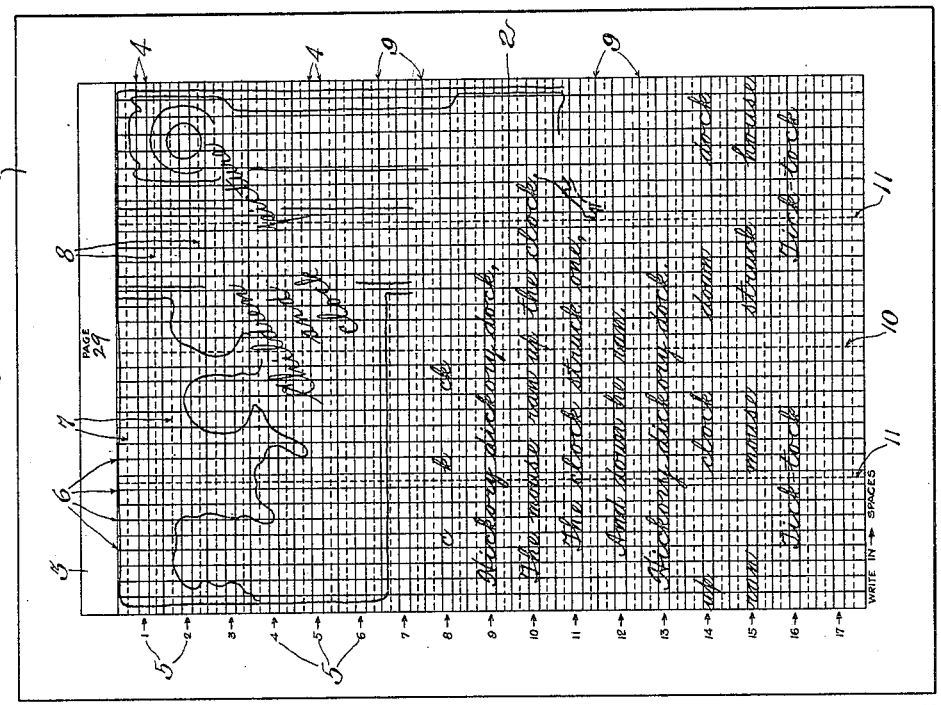
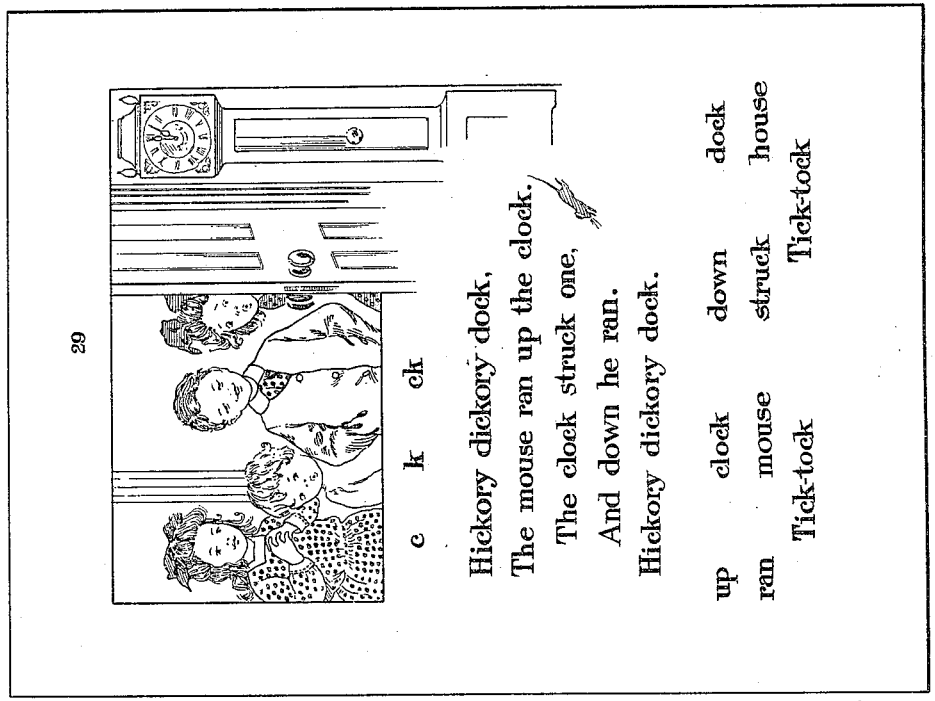
Witnesses:
Alice Ackroyd
L. J. Carr
Inventor:
William H. Greeley

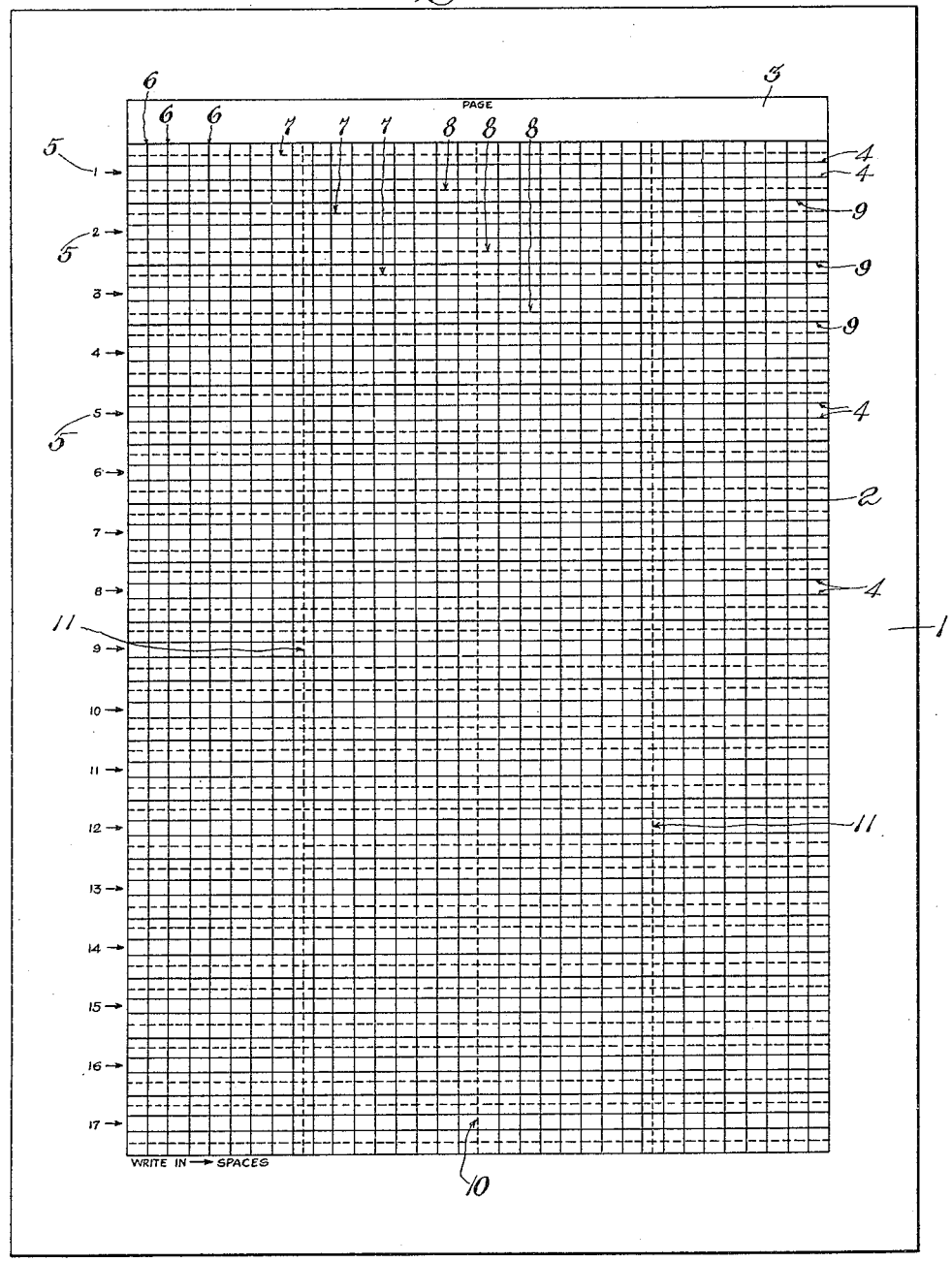

UNITED STATES PATENT OFFICE.

WILLIAN H. GREELEY, OF NEWTON, MASSACHUSETTS.

MANUSCRIPT WRITING-PAPER.

1,151,782.   Specification of Letters Patent.   Patented Aug. 31, 1915.

Application filed February 26, 1915. Serial No. 10,710.

*To all whom it may concern:*

Be it known that I, WILLIAN H. GREELEY, a citizen of the United States, residing at Newton, in the county of Middlesex and State of Massachusetts, have invented certain new and useful Improvements in Manuscript Writing-Paper; and I do hereby declare the following to be a full, clear, and exact description of the invention, such as will enable others skilled in the art to which it appertains to make and use the same.

The present invention relates to an improvement in manuscript writing paper.

In preparing the copy for certain kinds of books the author frequently writes it with the intent that the text shall be put into type, page for page with the copy, and he writes what he estimates will be a page of printed matter on each sheet. When the matter comes to be set up it often happens that the pages of copy contain too much matter for the size of the printed page, or too little matter for the size of the printed page, as the case may be, and this requires that the proof should be extensively revised by the author in order to secure the right amount of matter for each printed page. Furthermore, in some books the author intends to use illustrations in connection with the text on the page and it is desirable that as he composes the matter to be set up along with the illustrations he determine the amount of matter with relation to the size of the illustration, or conversely, that he arrange the size of the illustration to conform to the amount of text on the page. Heretofore, no successful means has ever been devised for avoiding the necessity of extensive revision of the proof in order to conform to the capacity of the printed page, and the object of the present invention is to overcome this difficulty by producing in any manner a manuscript paper for the author's use which will be provided with letter spaces corresponding in size, not to the size of the written letters, but to the size of the printed letters, so that in composing the matter the author may determine its amount and arrangement, and the position and size of the illustrations all at one time and thereby avoid the necessity of putting the matter into type before he can determine the position, size and shape of the illustrations and the position, size and shape of the word-matter to appear upon a page.

In the accompanying drawing Figure 1, is an illustration of a page of manuscript writing paper forming the subject of the invention; Fig. 2, is a representation of a sheet of copy as prepared by the author and Fig. 3, is a representation of the page set up from the copy.

The line 1 shows the size of the sheet of paper which the author uses and the size of this paper bears a certain ratio to the size of the printed page. The ratio may be any desired ratio convenient for use, as, for example, twice the size of the printed paper, and in any event the sheet corresponds to, but does not necessarily equal, the size of the printed page of the book. This paper is provided with a margin line 2 which extends all the way around the edge and determines the limits of the printed matter which is to appear upon the printed page. A space, 3, is provided at the top of the sheet for the page number and headings. Below this space, 3, the page is ruled to form spaces corresponding in size and arrangement to the size and arrangement of the type faces of the letters and lines of type of the printed page chosen for a particular book. The details will vary according to the typographic specifications for the printed page. The lines 4, 4, 4, etc., inclose between them the space within which the written letters of a single line are to appear. On the left-hand margin of the sheet are printed ordinals 5 of the lines with an arrow directed to the space between the lines 4, 4, above referred to. Then at the bottom of the page the words "Write in spaces" appear, which are for the purpose of directing the author to use these spaces, one for each line of the printed page. Vertical lines 6, 6, 6, etc., are provided, which are separated from each other by a distance corresponding to average width of the printed letter of the type which is to be used in setting up the page. It is to be noted that the horizontal lines 4, 4, and the vertical lines 6, 6, inclose within them letter spaces for the bodies of the type letters including also the leading or interlineage, which may be selected, which spaces correspond in size, not to that of the written letters, but to the size of the printed letters of the particular font of type which is to be used in setting up the page. These two sets of lines 4, 4, and 6, 6, are the principal guiding lines for informing the author of the proportionate size which the printed letters will occupy when they shall have been set up in type.

It is convenient for the author, however, particularly when arranging the printed words or letters so as to bear a certain relation to illustrations, that the full size of the possible letter face shall be indicated on the manuscript paper and to this end additional horizontal top lines 7 and bottom lines 8 are ruled on the paper. In order to distinguish these lines from the horizontal letter space lines 4, 4, these top and bottom letter lines are drawn as broken lines, while the horizontal letter space lines 4, 4, are ruled in blue lines. The vertical space letter lines 6, 6, are ruled in full lines. By means of the top and bottom letter lines 7 and 8 the author is able to determine where the top of the printed letters will come so as to determine the boundary of the spaces which may be occupied by illustrations. For the further convenience of the author the page is provided with interline rulings 9 which enable the author to judge how much space above the printed letter faces should be allowed in order that the illustrations should not be placed too close to the letter faces. In addition to this, the author sometimes desires to position words or phrases in the middle of a line or at various points in the line, and for his convenience in doing this the page is provided with the vertical half page lines 10 and the vertical quarter page lines 11. In no case is the character of the lines used or the color in which they may be reproduced essential to the invention.

In Fig. 2 is shown a sheet of manuscript paper upon which has been written in hand writing the various words and phrases which are to appear upon the printed page, and the spaces left for illustration are indicated, and in Fig. 3 a page printed from the type and cut set up from the manuscript sheet is shown. It will be noted that the printed page as shown in Fig. 3 differs slightly from the manuscript page shown in Fig. 2 owing to the adjustment of the display by the insertion of additional leads between ordinal lines 5 numbered 8 and 9 and between ordinal lines 5 numbered 13 and 14 so that the printed line corresponding to the ordinal line numbered 8 is separated from the five succeeding lines, and the lines corresponding to the ordinal lines numbered 14, 15 and 16 are separated slightly from the preceding five lines. This may be taken care of by the compositor and indicated by the usual leading marks on the copy.

The use of the manuscript writing paper forming the subject of this invention effects a great economy in the time of the author in preparing the copy for the book in the course of writing, and also effects an economy by reducing the corrections in proof; while further economy is secured in its reduction to printed form by reason of the fact that the artists employed in preparing drawings for the illustrations can be conveniently informed of the exact size of the spaces which the illustrations are to fill, so that great economy is secured in producing a book by the use of this paper.

The present invention is not limited to the embodiment illustrated in the drawings and described in the specification, as it contemplates any form of manuscript writing paper within the scope of the claim.

Having thus described the invention, what is claimed is:—

A sheet of manuscript writing paper having letter spaces indicated thereon corresponding in size and arrangement to the size and arrangement of the letter faces of the letters and lines of a page printed from type composed from the copy.

WILLIAN H. GREELEY.

Witnesses:
EDITH L. MACPHERSON,
MARY A. ALLEN.

Copies of this patent may be obtained for five cents each, by addressing the "Commissioner of Patents, Washington, D. C."